(12) United States Patent  (10) Patent No.:     US 6,648,231 B1
Chuang                           (45) Date of Patent:    Nov. 18, 2003

(54) ELECTRONIC APPARATUS HAVING AN INTERLOCKING DEVICE FOR LOCKING RELEASABLY A KEYBOARD DEVICE TO A HOST MODULE

(75) Inventor: Wei-Pin Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 10/329,554

(22) Filed: Dec. 27, 2002

(30) Foreign Application Priority Data

Nov. 15, 2002 (TW) ...................................... 91218428 U

(51) Int. Cl.⁷ ................................................. G06K 7/10
(52) U.S. Cl. .................. 235/472.01; 361/680; 361/801; 361/657; 341/22; 235/145 R
(58) Field of Search ....................... 235/472.01, 462.45, 235/462.43, 145 R, 130 R; 341/22; 361/640, 657, 680, 727, 801; 345/168, 169

(56) References Cited

U.S. PATENT DOCUMENTS 5,287,245 A  *  2/1994  Lucente et al. ............. 361/680
5,331,508 A  *  7/1994  Hosoi et al. ................. 361/680
5,659,307 A  *  8/1997  Kadiris et al. ................ 341/22
6,212,066 B1 *  4/2001  Fetterman .................... 361/680
6,317,061 B1 * 11/2001  Batra et al. .................... 341/22

* cited by examiner

*Primary Examiner*—Diane I. Lee
*Assistant Examiner*—Edwyn Labaze
(74) *Attorney, Agent, or Firm*—Bacon & Thomas, PLLC

(57) ABSTRACT

An electronic apparatus includes a host module, a keyboard device, and an interlocking device. The host module includes a- module case formed with a keyboard-receiving groove. A rear wall of the keyboard-receiving groove is formed with a latch-receiving groove and a latch hole. The keyboard device is disposed removably in the keyboard-receiving groove, and is formed with a latch-engaging groove that is registered with the latch hole when the keyboard device is disposed in the keyboard-receiving groove. The interlocking device includes a latch member biased by a biasing member. The latch member has a pivot portion pivotally retained in the latch-receiving groove, an operating portion extending from the pivot portion and exposed from the latch-receiving groove, and a latching portion extending from the pivot portion and formed with a latch projection that is extendible into the keyboard-receiving groove through the latch hole to engage the latch-engaging groove.

12 Claims, 5 Drawing Sheets

ELECTRONIC APPARATUS HAVING AN
INTERLOCKING DEVICE FOR LOCKING
RELEASABLY A KEYBOARD DEVICE TO A
HOST MODULE

CROSS-REFERENCE TO RELATED
APPLICATION

This application claims priority of Taiwanese application no. 091218428, filed on Nov. 15, 2002.

BACKGROUND OF THE INVENTION

1. Field of the Invention

The invention relates to an electronic apparatus, more particularly to an electronic apparatus having an interlocking device for locking releasably a keyboard device to a host module.

2. Description of the Related Art

A conventional portable electronic apparatus, such as a notebook computer, includes a host module and a display module connected pivotally to the host module. A keyboard device is mounted fixedly on the host module. As a result, users often operate the keyboard device in an awkward pose to maintain proper viewing of the display module, which is both inconvenient and unhealthy.

SUMMARY OF THE INVENTION

Therefore, the object of the present invention is to provide an electronic apparatus having an interlocking device for locking releasably a keyboard device to a host module so as to overcome the aforesaid drawback associated with the prior art.

Accordingly, an electronic apparatus of the present invention comprises:

a host module including a module case, the module case having a top side that is formed with a keyboard-receiving groove, the module case further having a rear wall that defines a rear end of the keyboard-receiving groove, the rear wall having front and rear sides opposite to each other in a first direction, and a lateral side that extends in the first direction and that interconnects the front and rear sides, the rear wall being formed with a latch-receiving groove that extends from the lateral side in a second direction transverse to the first direction, the latch-receiving groove being open at the rear side of the rear wall, the rear wall being further formed with a latch hole in the front side, the latch hole extending to the latch-receiving groove and being spaced apart from the lateral side in the second direction;

a keyboard device disposed removably in the keyboard-receiving groove, the keyboard device having a rear end formed with a latch-engaging groove that is registered with the latch hole when the keyboard device is disposed in the keyboard-receiving groove such that the rear end of the keyboard device is disposed adjacent to the rear wall of the module case; and an interlocking device for locking releasably the keyboard device to the host module, the interlocking device including a latch member movably disposed in the latch-receiving groove, the latch member having a pivot portion pivotally retained in the latch-receiving groove, an operating portion extending from the pivot portion and exposed from the latch-receiving groove at the rear side of the rear wall, and a latching portion extending from the pivot portion and formed with a wedge-shaped latch projection that has an inclined top side and that is extendible into the keyboard-receiving groove through the latch hole.

The operating portion is operable so as to pivot the latch member in the latch-receiving groove from a first position, where the latch projection extends into the keyboard-receiving groove through the latch hole, to a second position, where the latch projection is retracted into the latch-receiving groove and ceases to extend into the keyboard-receiving groove.

The interlocking device further includes a biasing member for biasing the latch member to pivot to the first position. Downward movement of the keyboard device into the keyboard-receiving groove while the latch member is at the first position enables the keyboard device to engage the inclined top side of the latch projection and to force the latch member to pivot from the first position to the second position against biasing action of the biasing member until the latch-engaging groove registers with the latch hole, during which time the latch member pivots from the second position back to the first position due to restoring action of the biasing member so as to engage the latch projection within the latch-engaging groove, thereby locking releasably the keyboard device to the host module.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE
PREFERRED EMBODIMENT

Figure 1:
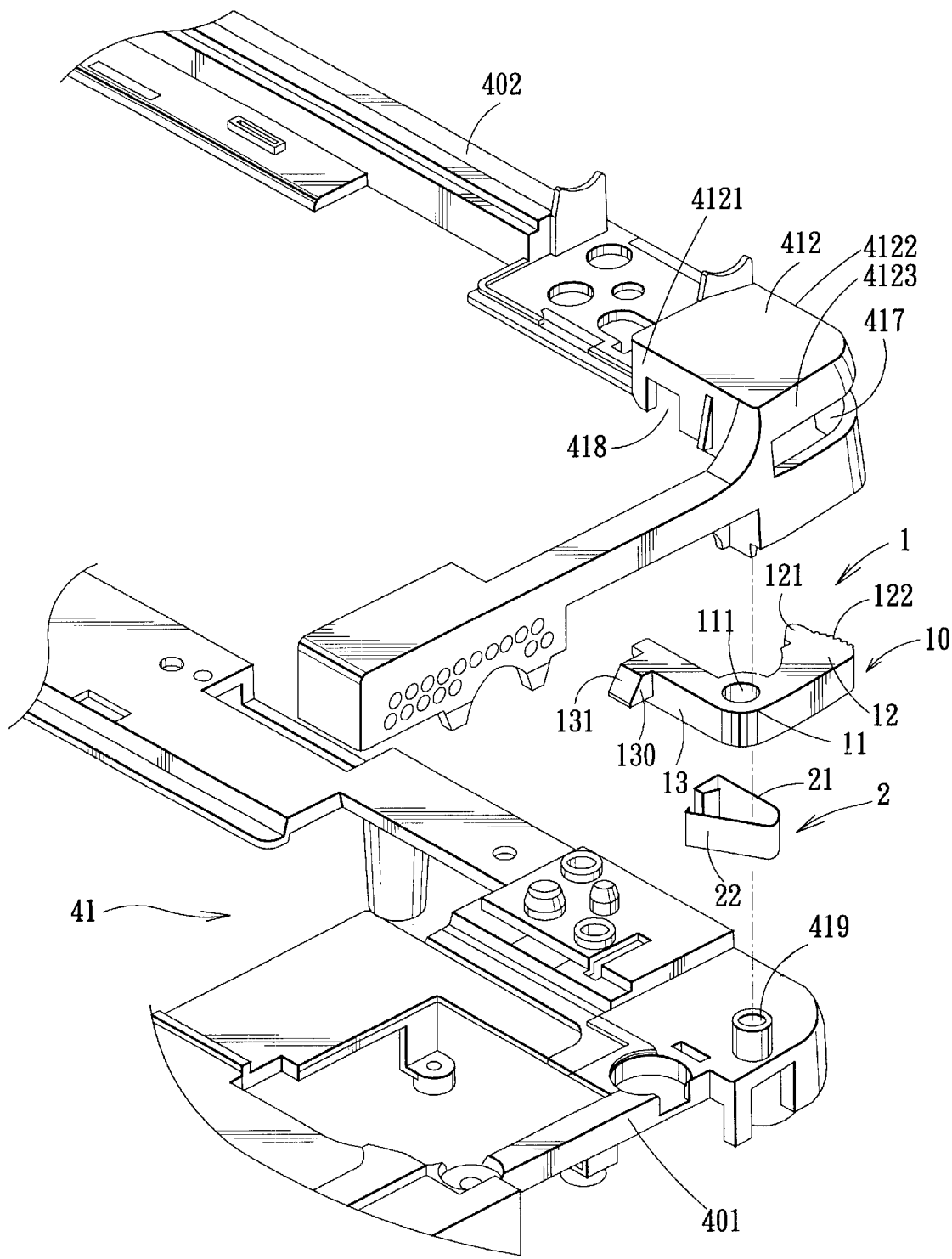
FIG. 1 is a fragmentary exploded perspective view of the preferred embodiment of an electronic apparatus according to the present invention.
Figure 2:
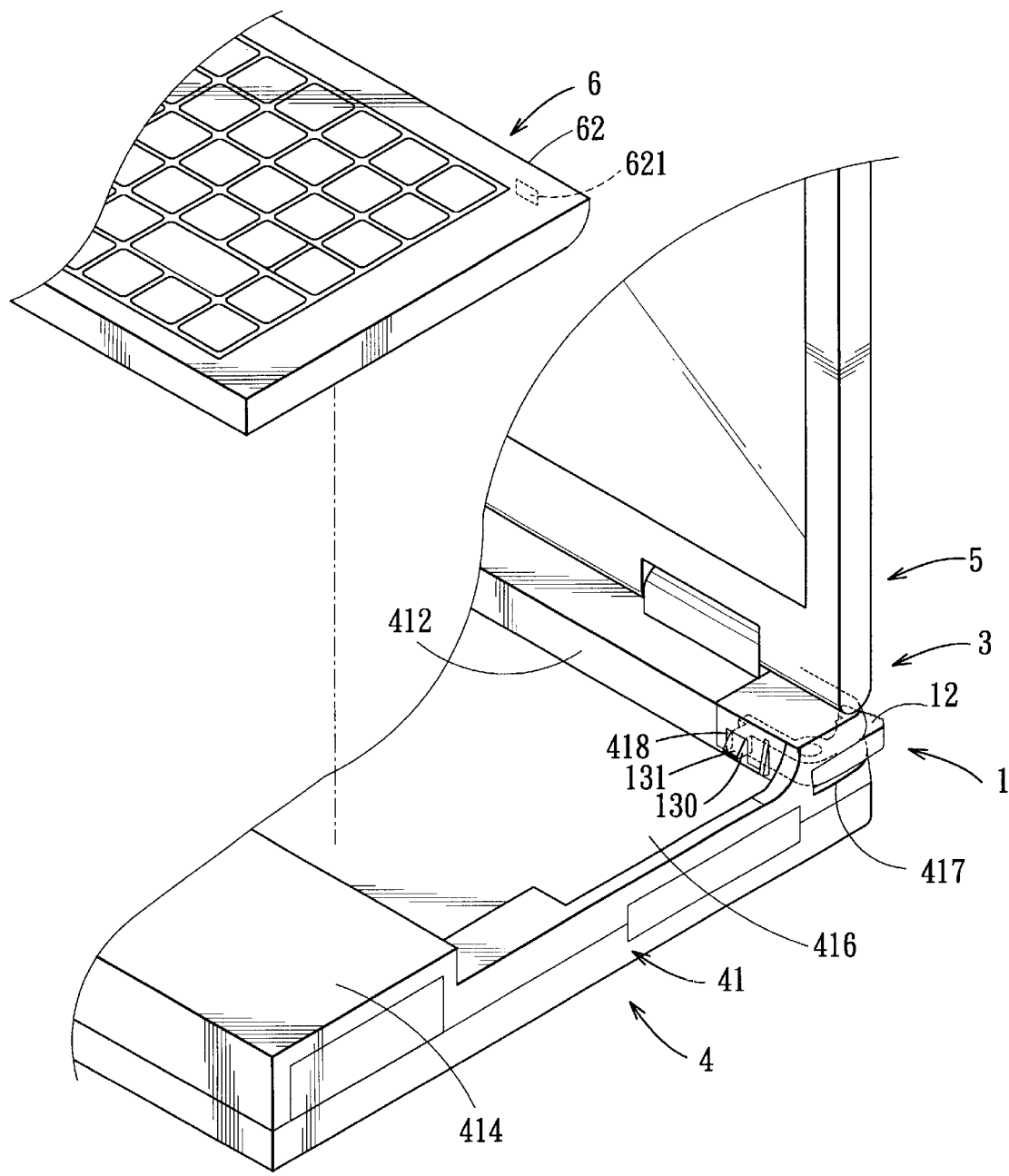
FIG. 2 is a fragmentary, partly exploded, perspective view of the preferred embodiment.

Referring to FIGS. 1 and 2, the preferred embodiment of an electronic apparatus 3 according to the present invention is shown to be in the form of a portable computer that includes a host module 4, a display module 5 connected pivotally to the host module 4, a keyboard device 6, and an interlocking device 1 for locking releasably the keyboard device 6 to the host module 4.

Figure 3:
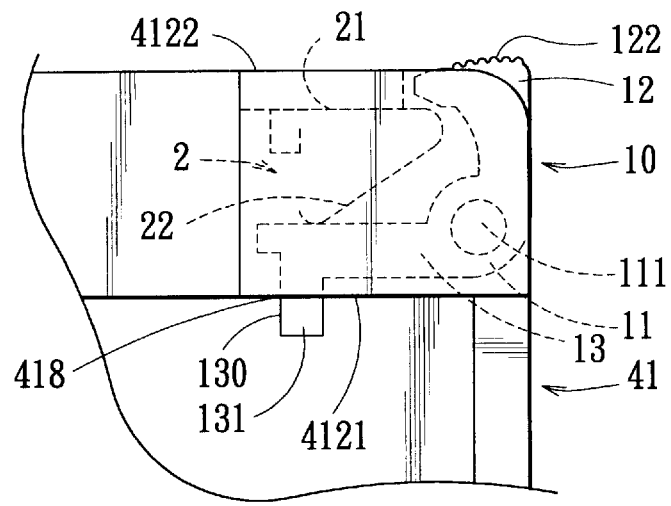
FIG. 3 is a fragmentary schematic top view of the preferred embodiment, illustrating a latch member of an inter locking device when disposed at a first position.

The host module 4 includes a module case 41 formed from complementary upper and lower casing parts 402, 401 for housing electronic components (not shown) therein. The module case 41 has a top side 414 that is formed with a keyboard-receiving groove 416. The module case 41 further has a rear wall 412 that defines a rear end of the keyboard-receiving groove 416. The rear wall 412 has front and rear sides 4121, 4122 opposite to each other in a first direction, and a lateral side 4123 that extends in the first direction and that interconnects the front and rear sides 4121, 4122. The rear wall 412 is formed with a latch-receiving groove 417 that extends from the lateral side 4123 in a second direction transverse to the first direction, and that is open at the rear side 4122 of the rear wall 412, as best shown in FIG. 3. The rear wall 412 is further formed with a latch hole 418 in the front side 4121. The latch hole 418 extends to the latch-receiving groove 417, and is spaced apart from the lateral side 4123 in the second direction.

The keyboard device 6 is disposed removably in the keyboard-receiving groove 416, and has a rear end 62 formed with a latch-engaging groove 621 that is registered with the latch hole 418 when the keyboard device 6 is disposed in the keyboard-receiving groove 416 in such a manner that the rear end 62 of the keyboard device 6 is disposed adjacent to the rear wall 412 of the module case 41.

The interlocking device 1 includes a latch member 10 and a biasing member 2. With further reference to FIG. 3, the latch member 10 is movably disposed in the latch-receiving groove 417, and has a pivot portion 11 pivotally retained in the latch-receiving groove 417, an operating portion 12 extending from the pivot portion 11 and exposed from the latch-receiving groove 417 at the rear side 4122 of the rear wall 412, and a latching portion 13 extending from the pivot portion 11 and formed with a wedge-shaped latch projection 130 that has an inclined top side 131 and that is extendible into the keyboard-receiving groove 416 through the latch hole 418. The latch member 10 is generally L-shaped such that the operating portion 12 and the latching portion 13 extend in mutually transverse directions relative to the pivot portion 11. The pivot portion 11 is formed with a pivot hole 111 so that the pivot portion 11 can be sleeved on a pivot post 419 of the module case 41. The operating portion 12 has an operating end 121 formed with a rugged surface 122 for increased traction. The biasing member 2 is disposed in the latch-receiving groove 417. In this embodiment, the biasing member 2 is a generally V-shaped resilient metal plate, and includes a positioning section 21 secured in the latch-receiving groove 417, and a resilient section 22 extending from the positioning section 21 to a but against the latching portion 13 of the latch member 10.

Figure 5:
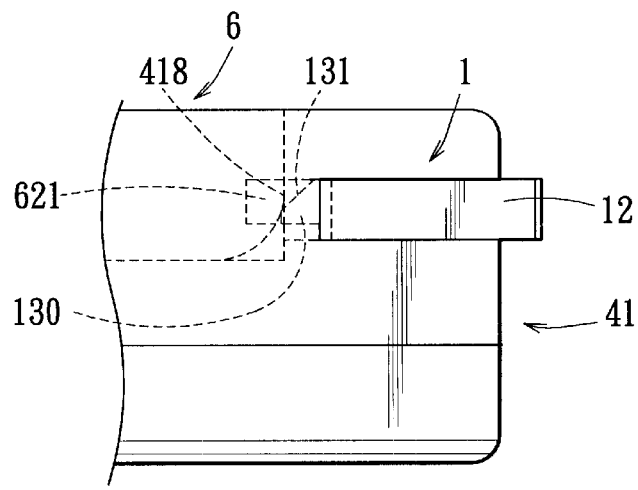
FIG. 5 is a view similar to FIG. 4, illustrating how the keyboard device forces the latch member to pivot from the first position to a second position.
Figure 6:
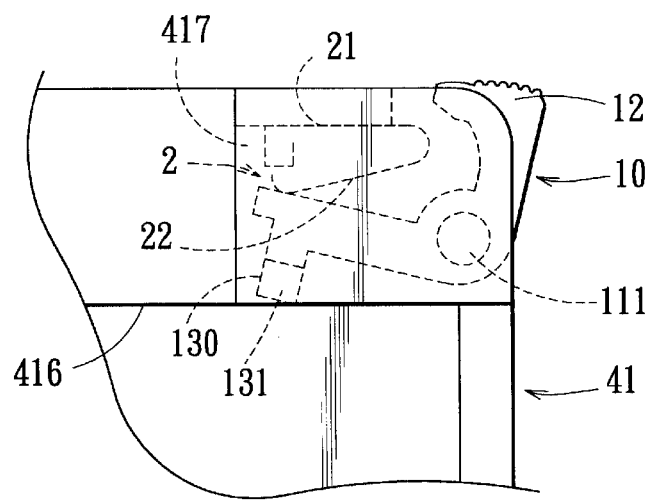
FIG. 6 is a view similar to FIG. 3, illustrating the latch member when pivoted to the second position.
Figure 7:
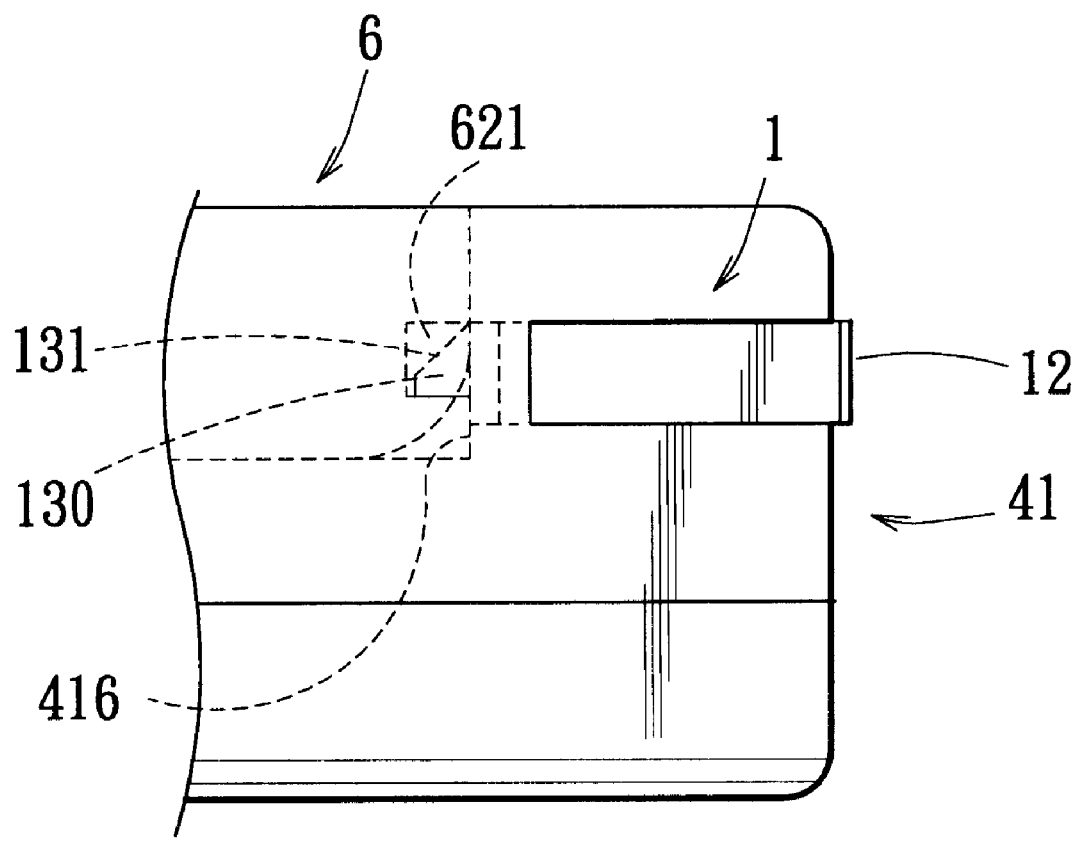
FIG. 7 is a view similar to FIG. 5, illustrating how the latch member engages the keyboard device for locking releasably the same to a host module.

The operating portion 12 is operable so as to pivot the latch member 10 in the latch-receiving groove 417 from a first position (see FIGS. 3 and 7), where the latch projection 130 extends into the keyboard-receiving groove 416 through the latch hole 418, to a second position (see FIGS. 5 and 6), where the latch projection 130 is retracted into the latch-receiving groove 417 and ceases to extend into the keyboard-receiving groove 416. The biasing member 2 serves to bias the latch member 10 to pivot to the first position.

Figure 4:
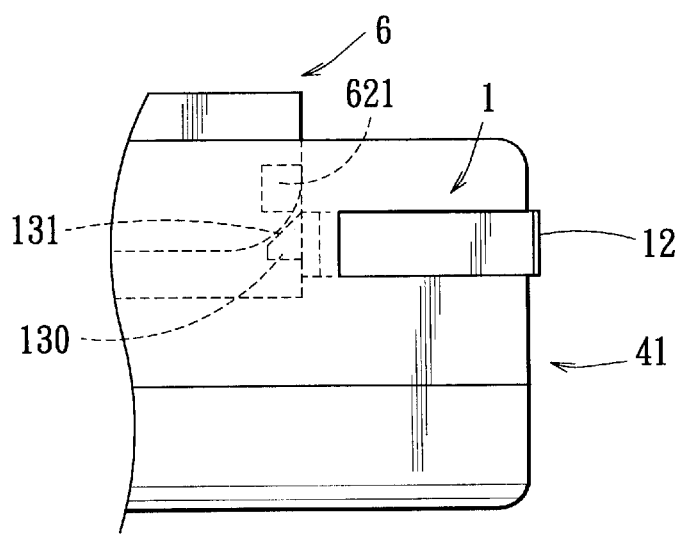
FIG. 4 is a fragmentary schematic side view of the preferred embodiment to illustrate how a keyboard device engages an inclined top side of a latch projection of the latch member.

In operation, as shown in FIG. 4, downward movement of the keyboard device 6 into the keyboard-receiving groove 416 while the latch member 10 is at the first position enables the keyboard device 6 to engage the inclined top side 131 of the latch projection 130 and to force the latch member 10 to pivot from the first position to the second position against biasing action of the biasing member 2 (see FIGS. 5 and 6) until the latch-engaging groove 621 registers with the latch hole 418, during which time the latch member 10 pivots from the second position back to the first position due to restoring action, of the biasing member 2 so as to engage the latch projection 130 within the latch-engaging groove 621 (see FIG. 7), thereby locking releasably the keyboard device 6 to the host module 4.

Accordingly, when the operating portion 12 is forced to pivot the latch member 10 to the second position, the keyboard device 6 is released from engagement with the latch member 10 and can be removed from the keyboard-receiving groove 416 at this time.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An electronic apparatus comprising:

a host module including a module case, said module case having a top side that is formed with a keyboard-receiving groove, said module case further having a rear wall that defines a rear end of said keyboard-receiving groove, said rear wall having front and rear sides opposite to each other in a first direction, and a lateral side that extends in the first direction and that interconnects said front and rear sides, said rear wall being formed with a latch-receiving groove that extends from said lateral side in a second direction transverse to the first direction, said latch-receiving groove being open at said rear side of said rear wall, said rear wall being further formed with a latch hole in said front side, said latch hole extending to said latch-receiving groove and being spaced apart from said lateral side in the second direction;

a keyboard device disposed removably in said keyboard-receiving groove, said keyboard device having a rear end formed with a latch-engaging groove that is registered with said latch hole when said keyboard device is disposed in said keyboard-receiving groove such that said rear end of said keyboard device is disposed adjacent to said rear wall of said module case; and an interlocking device for locking releasably said keyboard device to said host module, said interlocking device including a latch member movably disposed in said latch-receiving groove, said latch member having a pivot portion pivotally retained in said latch-receiving groove, an operating portion extending from said pivot portion and exposed from said latch-receiving groove at said rear side of said rear wall, and a latching portion extending from said pivot portion and formed with a wedge-shaped latch projection that has an inclined top side and that is extendible into said keyboard-receiving groove through said latch hole;

said operating portion being operable so as to pivot said latch member in said latch-receiving groove from a first position, where said latch projection extends into said keyboard-receiving groove through said latch hole, to a second position, where said latch projection is retracted into said latch-receiving groove and ceases to extend into said keyboard-receiving groove;

said interlocking device further including a biasing member for biasing said latch member to pivot to the first position;

wherein downward movement of said keyboard device into said keyboard-receiving groove while said latch member is at the first position enables said keyboard device to engage said inclined top side of said latch projection and to force said latch member to pivot from the first position to the second position against biasing action of said biasing member until said latch-engaging groove registers with said latch hole, during which time said latch member pivots from the second position back to the first position due to restoring action of said biasing member so as to engage said latch projection within said latch-engaging groove, thereby locking releasably said keyboard device to said host module.

2. The electronic apparatus as claimed in claim 1, further comprising a display module connected pivotally to said host module.

3. The electronic apparatus as claimed in claim 2, wherein said display module and said host module cooperate to form a portable computer.

4. The electronic apparatus as claimed in claim 1, wherein said latch member is generally L-shaped.

5. The electronic apparatus as claimed in claim 1, wherein said operating portion and said latching portion of said latch member extend in mutually transverse directions relative to said pivot portion.

6. The electronic apparatus as claimed in claim 1, wherein said operating portion of said latch member is formed with a rugged surface for increased traction.

7. The electronic apparatus as claimed in claim 1, wherein said biasing member has a positioning section secured in said latch-receiving groove, and a resilient section extending from said positioning section to abut against said latching portion of said latch member.

8. An interlocking device for an electronic apparatus, the electronic apparatus including
a host module including a module case, the module case having a top side that is formed with a keyboard-receiving groove, the module case further having a rear wall that defines a rear end of the keyboard-receiving groove, the rear wall having front and rear sides opposite to each other in a first direction, and a lateral side that extends in the first direction and that interconnects the front and rear sides, the rear wall being formed with a latch-receiving groove that extends from the lateral side in a second direction transverse to the first direction, the latch-receiving groove being open at the rear side of the rear wall, the rear wall being further formed with a latch hole in the front side, the latch hole extending to the latch-receiving groove and being spaced apart from the lateral side in the second direction, and
a keyboard device disposed removably in the keyboard-receiving groove, and having a rear end formed with a latch-engaging groove that is registered with the latch hole when the keyboard device is disposed in the keyboard-receiving groove such that the rear end of the keyboard device is disposed adjacent to the rear wall of the module case, said interlocking device being adapted to lock releasably the keyboard device to the host module, and comprising:
a latch member adapted to be movably disposed in the latch-receiving groove, said latch member having a pivot portion adapted to be pivotally retained in the latch-receiving groove, an operating portion extending from said pivot portion and to be exposed from the latch-receiving groove at the rear side of the rear wall when said latch member is disposed in the latch-receiving groove, and a latching portion extending from said pivot portion and formed with a wedge-shaped latch projection that has an inclined top side, said latch projection being adapted to extend into the keyboard-receiving groove through the latch hole;
said operating portion being operable so as to pivot said latch member in the latch-receiving groove from a first position, where said latch projection extends into the keyboard-receiving groove through the latch hole, to a second position, where said latch projection is retracted into the latch-receiving groove and ceases to extend into the keyboard-receiving groove; and
a biasing member for biasing said latch member to pivot to the first position;
whereby, downward movement of the keyboard device into the keyboard-receiving groove while said latch member is at the first position enables the keyboard device to engage said inclined top side of said latch projection and to force said latch member to pivot from the first position to the second position against biasing action of said biasing member until the latch-engaging groove registers with the latch hole, during which time said latch member is adapted to pivot from the second position back to the first position due to restoring action of said biasing member so as to be adapted to engage said latch projection within the latch-engaging groove, thereby locking releasably the keyboard device to the host module.

9. The interlocking device as claimed in claim 8, wherein said latch member is generally L-shaped.

10. The interlocking device as claimed in claim 8, wherein said operating portion and said latching portion of said latch member extend in mutually transverse directions relative to said pivot portion.

11. The interlocking device as claimed in claim 8, wherein said operating portion of said latch member is formed with a rugged surface for increased traction.

12. The interlocking device as claimed in claim 8, wherein said biasing member has a positioning section adapted to be secured in the latch-receiving groove, and a resilient section extending from said positioning section to abut against said latching portion of said latch member.

\* \* \* \* \*